US011432481B2

(12) United States Patent
Drechsel

(10) Patent No.: US 11,432,481 B2
(45) Date of Patent: Sep. 6, 2022

(54) DROP HOSE IRRIGATION DEVICE AND METHOD OF MOUNTING SUCH IRRIGATION DEVICE TO A SUPPORTING ROD OF AN IRRIGATION SYSTEM

(71) Applicant: Arno Drechsel, Lienz (AT)

(72) Inventor: Arno Drechsel, Lienz (AT)

( * ) Notice: Subject to any disclaimer, the term of this patent is extended or adjusted under 35 U.S.C. 154(b) by 199 days.

(21) Appl. No.: 16/500,711

(22) PCT Filed: Apr. 12, 2018

(86) PCT No.: PCT/IB2018/052559
§ 371 (c)(1),
(2) Date: Oct. 3, 2019

(87) PCT Pub. No.: WO2018/189707
PCT Pub. Date: Oct. 18, 2018

(65) Prior Publication Data
US 2020/0029516 A1    Jan. 30, 2020

(30) Foreign Application Priority Data

Apr. 13, 2017    (IT) ......................... 102017000041513

(51) Int. Cl.
*A01G 25/09*        (2006.01)
*A01G 25/02*        (2006.01)
*F16L 3/12*         (2006.01)
*F16L 3/13*         (2006.01)

(52) U.S. Cl.
CPC ........... *A01G 25/023* (2013.01); *A01G 25/09* (2013.01); *F16L 3/1215* (2013.01); *F16L 3/13* (2013.01)

(58) Field of Classification Search
CPC ..... A01G 25/023; A01G 25/09; F16L 3/1215; F16L 3/13; F16L 3/1226; F16L 3/137; F16L 3/123; F16L 3/1223; F16L 3/233; F16L 3/2336; F16L 3/2338; F16L 3/223; F16L 3/227; F16L 59/135; A01M 7/0053
USPC ......... 248/71, 72, 73, 67.7, 68.1, 74.3, 74.1; 239/726
See application file for complete search history.

(56) References Cited

U.S. PATENT DOCUMENTS

| 1,601,612 A | * | 9/1926 | Edwards | ................. E04H 17/10 |
| | | | | 248/66 |
| 2,616,646 A | * | 11/1952 | Matthysse | ............. F16L 3/1091 |
| | | | | 248/65 |

(Continued)

*Primary Examiner* — Nkeisha Smith
(74) *Attorney, Agent, or Firm* — Themis Law

(57) ABSTRACT

A drop base irrigation device includes a substantially vertical pipeline section, which is adapted to be secured to a truss of an irrigation system by a substantially horizontal supporting rod, and a support having a substantially U-shaped bracket. The bracket includes a pair of side walls and a curved connecting wall extending along a substantially horizontal axis. The side and connecting walls have substantially cylindrical smooth inner surfaces with substantially parallel opposed projections for snap-fit locking engagement of the rod in the bracket. A pair of curved appendages extend from one of the side walls and define a pair of substantially vertical seats with oppositely directed concavities for receiving the substantially vertical pipeline section and locking it by rotation about a substantially horizontal axis. A method of mounting a drop base irrigation device to a supporting rod of an irrigation system.

10 Claims, 3 Drawing Sheets

(56) References Cited

U.S. PATENT DOCUMENTS

| | | | | |
|---|---|---|---|---|
| 2,942,314 A * | 6/1960 | Debner | .................... | F16L 3/237 403/391 |
| 3,436,108 A * | 4/1969 | Van Buren, Jr. | ...... | F16B 5/0685 52/489.1 |
| 3,905,070 A * | 9/1975 | Macrae | .................... | F16B 2/245 403/191 |
| 4,039,744 A * | 8/1977 | Seaquist | ................ | H01B 17/18 174/169 |
| 4,478,445 A * | 10/1984 | Shimizu | ................... | E05B 79/12 292/336.3 |
| 4,521,988 A * | 6/1985 | Thacker | .............. | A01M 7/0064 47/1.7 |
| 4,550,891 A * | 11/1985 | Schaty | ................... | F16B 21/071 174/166 R |
| 4,673,151 A * | 6/1987 | Pelz | ...................... | F16L 3/1215 24/336 |
| 4,861,081 A * | 8/1989 | Satoh | ................... | E05B 79/12 292/336.3 |
| 4,997,147 A * | 3/1991 | Velke, Sr. | ............ | F16L 3/1215 248/230.7 |
| D323,614 S * | 2/1992 | Bell | ................ | D8/373 |
| 5,351,920 A * | 10/1994 | Decky | ...................... | F16L 3/13 248/222.52 |
| 5,779,163 A * | 7/1998 | Gunter | ................. | A01G 25/092 239/728 |
| 5,836,055 A * | 11/1998 | Cooper | ................ | B43K 23/001 24/339 |
| 6,134,754 A * | 10/2000 | Hansson | ............... | A61M 25/02 24/115 R |
| 6,422,523 B1 * | 7/2002 | Weshler | ............... | A47B 57/402 248/220.22 |
| 6,631,876 B1 * | 10/2003 | Phillips | .................... | F16B 2/22 248/74.2 |
| 6,745,985 B2 * | 6/2004 | Healy | ...................... | F16L 3/13 248/75 |
| 7,294,789 B1 * | 11/2007 | Watthanasintham | ........................ | B60R 16/0215 174/135 |
| 7,618,015 B2 * | 11/2009 | Jahnz | ...................... | B60R 13/00 211/60.1 |
| 8,083,188 B2 * | 12/2011 | Kittle | ..................... | B05B 15/74 248/74.2 |
| 8,091,846 B1 * | 1/2012 | Britner | ..................... | B25H 1/00 248/219.3 |
| 8,317,149 B2 * | 11/2012 | Greenburg | ........... | A61B 1/2676 248/316.7 |
| 8,523,121 B2 * | 9/2013 | Shelton | ................... | A01G 25/09 248/75 |
| 8,573,544 B2 * | 11/2013 | Shelton | ...................... | B25J 1/04 248/75 |
| 9,061,416 B2 * | 6/2015 | Shelton | ................... | A01G 25/09 |
| 9,420,752 B2 * | 8/2016 | Teeter | ................... | A01G 25/092 |
| 9,869,092 B1 * | 1/2018 | Rush | ...................... | E04C 5/167 |
| 10,018,216 B1 * | 7/2018 | Espinosa | ............ | F16B 37/0814 |
| 10,050,428 B2 * | 8/2018 | Wessel | ..................... | H02G 3/32 |
| 10,274,110 B1 * | 4/2019 | Liu | ...................... | F16B 21/073 |
| 2004/0069912 A1 * | 4/2004 | Healy | ...................... | F16L 3/13 248/75 |
| 2009/0072099 A1 * | 3/2009 | Trotter | ................... | F16L 55/035 248/74.1 |
| 2013/0043326 A1 * | 2/2013 | Muff | ...................... | A01C 23/04 239/159 |
| 2015/0211660 A1 * | 7/2015 | Rice | ...................... | F16L 3/1226 248/75 |
| 2015/0224009 A1 * | 8/2015 | Cedrone | ............... | F16M 13/04 128/845 |
| 2017/0234580 A1 * | 8/2017 | Worden | ................ | F24S 30/425 126/606 |
| 2019/0008101 A1 * | 1/2019 | Teeter | ................... | A01G 25/092 |

\* cited by examiner

DROP HOSE IRRIGATION DEVICE AND METHOD OF MOUNTING SUCH IRRIGATION DEVICE TO A SUPPORTING ROD OF AN IRRIGATION SYSTEM

FIELD OF THE INVENTION

The present invention generally finds application in the field of irrigation systems for agricultural applications and particularly relates to a drop hose irrigation device.

In a further aspect, the invention relates to a method of mounting a drop hose irrigation device to a supporting rod of an irrigation system.

BACKGROUND ART

In the field of irrigation, systems have been long known which comprise a self-propelled load-bearing structure moving along a portion of soil to be irrigated and a liquid-feeding line connected to a plurality of emitter devices, which are adapted to distribute a liquid on the soil.

Generally, the feeding line comprises a rigid pipeline mounted on top of the load-bearing structure and in fluid communication with the liquid emitters, which are oriented vertically downwards, via respective flexible pipes.

In this arrangement, the liquid emitters are evenly arranged along the extent of the feeding line and are adapted to distribute the liquid jet downwards by gravity feed.

A first drawback of these systems is that the liquid emitters are placed at a short distance from the soil and can only irrigate a small portion thereof.

A further drawback is that the emitters are exposed to the oscillations caused by the pressure of the liquid being fed and/or the wind.

Yet another drawback is that the liquid emitters cannot be moved along the feeding line and the spacing therebetween cannot be changed.

In an attempt to at least partially obviate these drawbacks, irrigation systems have been developed in which the pipelines and their respective liquid emitters are connected to the horizontal supporting rods of the truss using respective connecting supports, to extend the irrigated soil surface and allow more time for water-absorption by the soil.

Nevertheless, one drawback of these arrangements is that the connection of the pipelines to the rods is very complex and the supports are prone to failure and do not allow pipeline displacement along the rod once pipelines have been fitted into the supports.

A further drawback is that an operator shall use different supports to connect pipelines of different sizes. Due to this drawback, the operator is required to have various types of supports on stock, differing according to the types of irrigation to be provided.

U.S. Pat. No. 5,351,920 discloses a support adapted to be secured to a vertical rigid rod by means of two oppositely-directed C-shaped threaded appendages and comprising a U-shaped concave wall for horizontally supporting a pipe.

This support further comprises two elongate members, which are adapted to cooperate with the threaded appendages and the concave wall respectively to hold the rod and the pipe connected with the support in a locked position.

In order to facilitate connection of the pipeline to the rod, the operator must first introduce the rod into the appendages and rotate the support to move the rod to the locked position, and then place the pipe into the concave wall.

A first drawback of this arrangement is that the threaded appendages and the elongate elements are very rigid and the rod and the pipe are not easily introduced and locked therein.

A further drawback is that this support does not allow the pipe to be connected to the rod in a durable manner.

Yet another drawback is that the support does not afford adjustment of the pipe position along the rod once the pipe has been placed in the slot formed by the concave wall.

This drawback dramatically increases the time required to adjust the spacings between a plurality of pipelines connected to the same rod and requires special operator skills.

Technical Problem

In the light of the prior art, the technical problem addressed by the present invention is to provide a drop hose irrigation device that affords simple installation of pipelines, easy and quick adjustment of their positions along a supporting rod and durable support.

DISCLOSURE OF THE INVENTION

The object of the present invention is to obviate the above drawback, by providing a drop hose irrigation device that is highly efficient and relatively cost-effective.

A particular object of the present invention is to provide an irrigation device as described hereinabove that affords quick and simple connection and disconnection of the pipeline relative to a supporting rod of the truss.

A further object of the present invention is to provide a drop hose irrigation device as described hereinabove that can connect the pipelines to a supporting rod of the truss in a durable manner.

Another object of the present invention is to provide a drop hose irrigation device as described hereinabove, that requires no particular operator skills during installation.

A further object of the present invention is to provide a drop hose irrigation device as described hereinabove that allows the pipelines to be displaced along the supporting rod and their spacing to be easily and quickly adjusted.

Yet another object of the present invention is to provide a method of mounting a drop hose irrigation device to a supporting rod of an irrigation system, that can be carried out easily and quickly.

The above mentioned purposes, and others that will be more clearly explained hereinafter, are fulfilled by a drop hose irrigation device as defined in claim 1, which comprises a substantially vertical pipeline section adapted to be secured to a truss of an irrigation system by means of a supporting rod and a support having a bracket adapted to be secured to the supporting rod which has a pair of curved appendages extending therefrom, and defining respective seats with oppositely-directed concavities.

The seats are configured to allow the pipeline to be fitted therein and locked by rotating about a substantially horizontal axis.

In a further aspect, the invention relates to a method of mounting a drop hose irrigation device to a supporting rod of an irrigation system as defined in claim 10.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a drop hose irrigation device and the method of connecting the pipeline to a supporting rod of a truss, which are described as a non-limiting example with the help of the annexed drawings, in which.

DETAILED DESCRIPTION OF A PREFERRED EXEMPLARY EMBODIMENT

Particularly referring to the figures, a drop hose irrigation device 1' is shown, which comprises a substantially vertical pipeline section 2 adapted to be secured to a truss 3 of a gravity-fed irrigation system 4.

Figure 1:
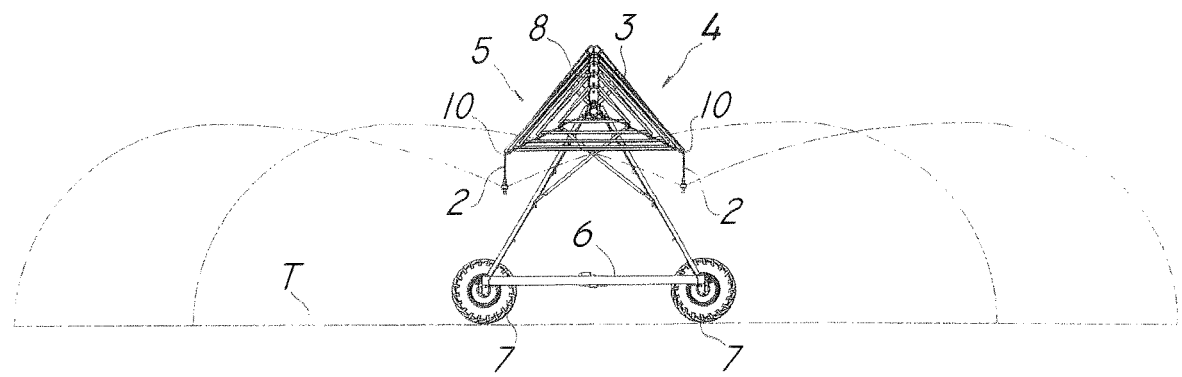
FIG. 1 is a side view of a drop hose irrigation system of the invention.

As best shown in FIG. 1, the irrigation system 4 may be of the pivot or linear type and comprises a load-bearing structure 5 with a pair of posts 6 mounted on wheels 7 for moving the load-bearing structure 5 along the soil T to be irrigated.

The load-bearing structure 5 comprises a feeding line 8 for feeding an irrigation liquid, which is composed of a rigid conduit 9 and a truss 3 having at least a substantially horizontal supporting rod 10.

Figure 2:
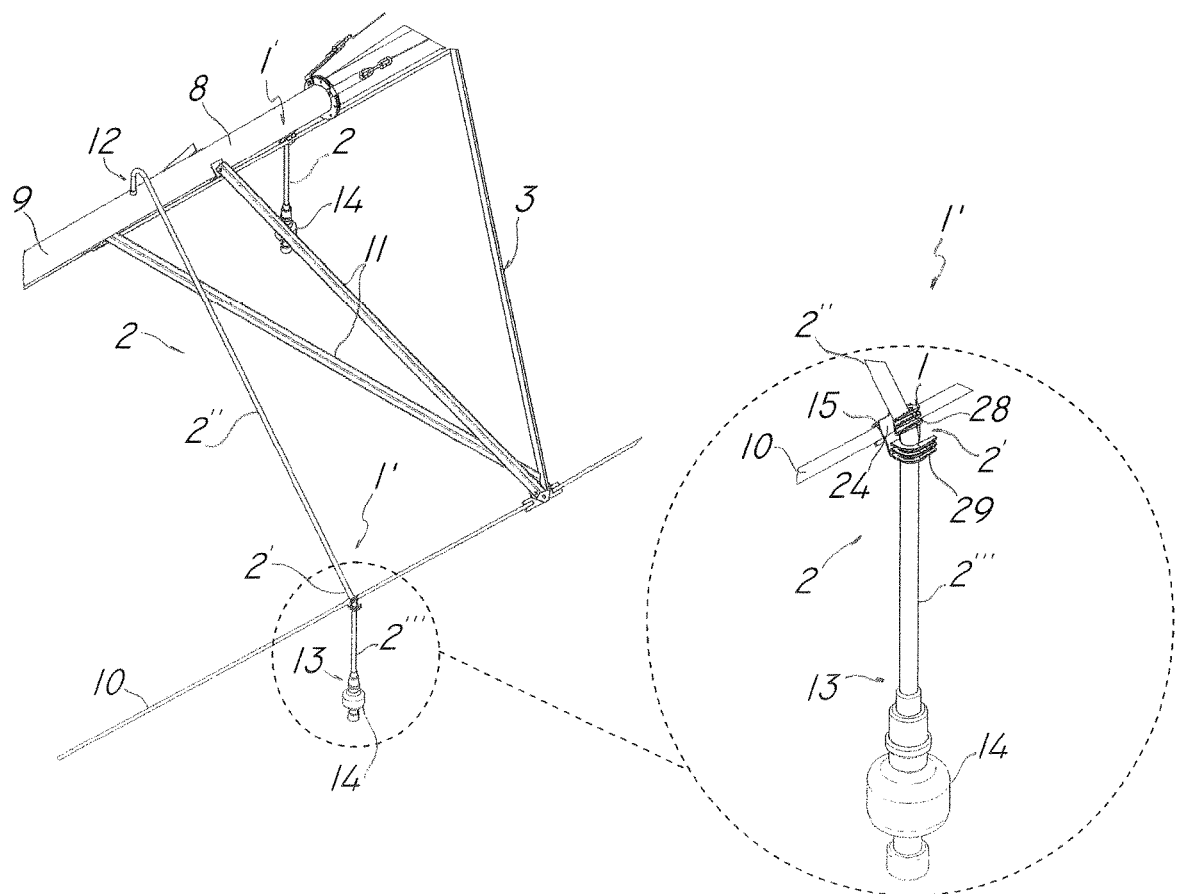
FIG. 2 is a perspective view of a respective magnified portion of the system of FIG. 1 in which the connecting support of the invention is visible.
Figure 3:
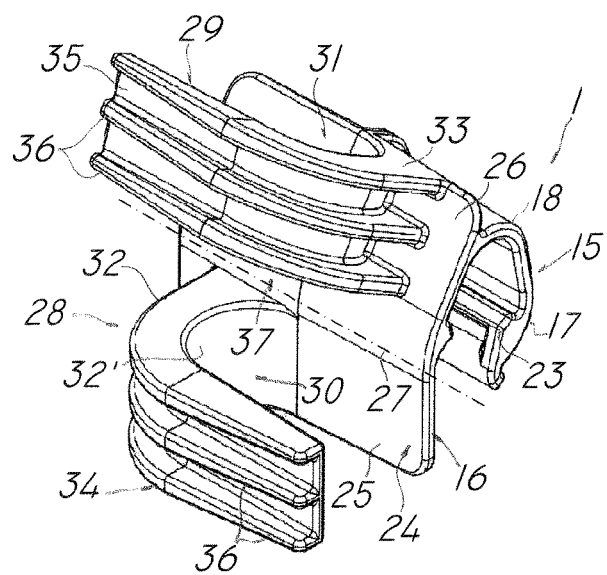
FIGS. 3 to 6 are perspective lateral and bottom views of the support of FIG. 2 respectively.
Figure 4:
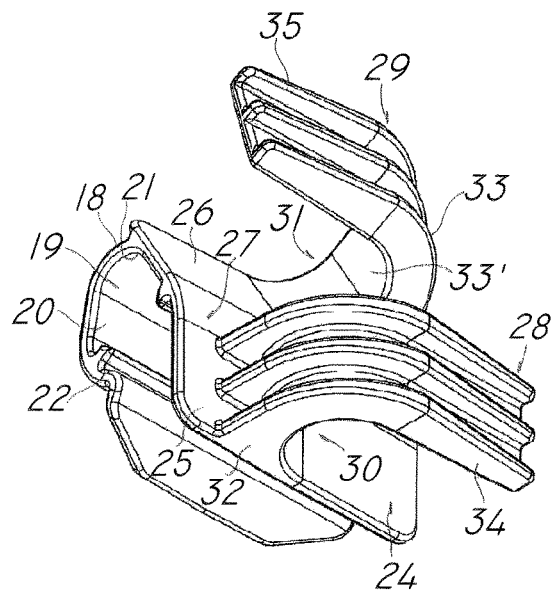
Figure 5:
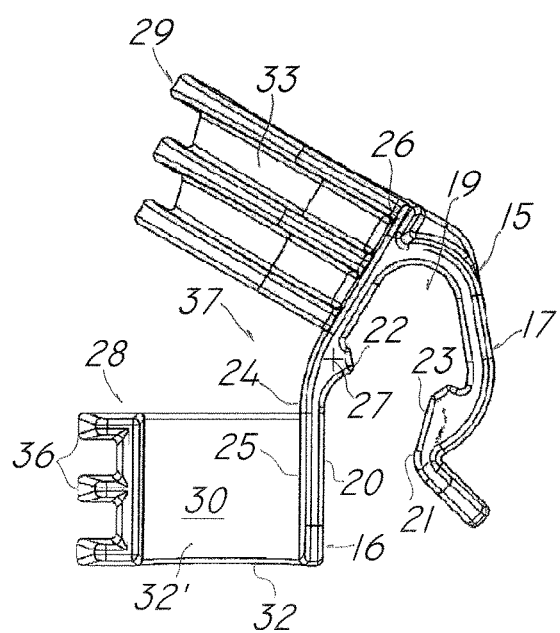
Figure 6:
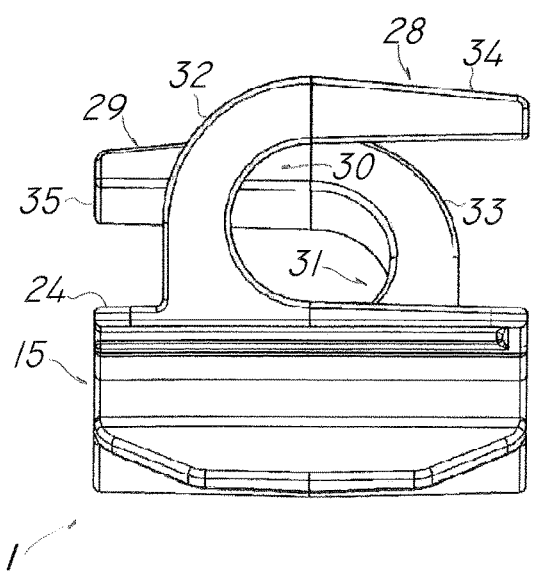

In the illustrated embodiment, two supporting rods 10 are provided at the sides of the feeding line 8 in a vertically downwardly offset position relative to the latter. Furthermore, the rods 10 and the feeding line 8 are connected by means of a plurality of rigid tie rods 11, as best shown in FIG. 2.

The irrigation system 4 also comprises a plurality of pipelines 2 having an upper end 12 in fluid communication with the feeding line 8 and a lower end 13 equipped with a liquid emitter 14.

The pipelines 2 are removably connected to the supporting rods 10 via respective inventive connecting supports 1 at an intermediate section thereof.

At the connecting support 1, the pipeline, which is of flexible type, forms a bend angle which defines a section 2" upstream from the intermediate section 2', which is connected to the feeding line 8 and is inclined with respect to the latter and a section 2m downstream from the intermediate section 2', which is substantially vertical relative to the rod 10, such that the emitter 14 may be oriented by gravity toward the soil T.

As is known per se, this configuration considerably increases the irrigated surface of the soil T, as compared to the systems whose emitters directly hang from the feeding line via their respective pipes, and reduces the hourly water emission rate.

In a preferred embodiment of the invention, the connecting support 1 for connecting the pipeline 2 to the rod 10 of the truss 3 comprises a bracket 15 that is adapted to be secured to the rod 10.

Namely, the bracket 15 has a substantially U-shaped section with a pair of side walls 16, 17 and a substantially cylindrical connecting wall 18, located above the side walls 16, 17 and extending along a substantially horizontal axis.

These walls 16, 17, 18 define an elongated recess 19, which is designed to allow snap-fit locking engagement of the rod 10 of the truss 3.

In addition, the inner surfaces 20, 21 of the side walls 16, 17, which face the recess 19 are substantially cylindrical and smooth, with respective projections 22, 23 formed on such inner surfaces 20, 21.

The projections 22, 23 are opposed and substantially parallel and are adapted to allow snap-fit locking engagement of the rod 10 as it is introduced into the bracket 15.

Advantageously, the projections 22, 23 allow the bracket 15 to frictionally slide along the rod 10 to change the position of the support 1, or to adjust its distance from the other supports 1 on the same rod 10 or to fit the actual diameter of the rod 10.

One of the aforementioned side walls 16 comprises a supporting surface 24, opposite to its respective inner surface 20 that faces the recess 19, for the pipeline 2 to rest thereupon as it is being connected with the rod 10.

In operation, i.e. when the bracket is in snap-fit engagement with the rod 10, the side wall 16 comprising the supporting surface 24 is the wall that faces away from the feeding line 8, as shown in the figures.

The supporting surface 24 may comprise a first substantially flat portion 25 and a second portion 26, that is also flat and is inclined relative to the first portion.

These portions 25, 26 are connected together along a substantially longitudinally connecting line 27, which defines the bend angle of the flexible pipeline 2 when the latter is connected to the rod 10.

Particularly, the upstream section 2" of the pipeline 2 rests on the second portion 26 of the bracket 15 and the downstream section 2'" of the pipeline 2 rests on the first portion 25 of the bracket 15.

In a peculiar aspect of the invention, the support 1 comprises a pair of curved appendages 28, 29 which extend from the bracket 15 and define a pair of substantially vertical seats 30, 31 with oppositely directed concavities. These curved appendages 28, 29 are substantially horizontal and vertically offset.

The seats 30, 31 are configured to allow the pipeline 2 to be fitted therein and locked by rotating about a substantially horizontal axis X from a substantially horizontal position to a substantially vertical position.

Advantageously, the horizontal rotation axis X of the pipeline 2 lies on the same plane as the longitudinal line 27 that connects the portions 25, 26 of the support surface 24 and is perpendicular thereto.

The first curved appendage 28 extends from the first portion 25 of the supporting surface 24, whereas the second curved appendage 29 extends from the second portion 26 of the supporting surface 24 and both may be substantially parallel to the connecting line 27.

Particularly, the appendages 28, 29 comprise respective curved connecting sections 32, 33 which are rigidly joined to the respective portions 25, 26 of the supporting surface 24, and respective straight sections 34, 35 substantially parallel to and spaced from such portions 25, 26.

Therefore, the U-shaped seats 30, 31 will be delimited by the portions 25, 26 of the supporting surface 24 and by the straight sections 34, 35 and the curved sections 32, 33 of the appendages 28, 29. Furthermore, the curved section 32, 33 may have a substantially semicircular shape, mating the shape of the pipeline 2.

The curved sections 32, 33 and the straight sections 34, 35 of the appendages 28, 29 may have respective series of outer ribs 36 for imparting greater stiffness thereto, particularly during insertion of the pipeline 2.

Advantageously, the support 1 may be formed with a thermoplastic polymer material by a single molding process.

The use of such material allows the support to be highly deformable during snap-fit engagement on the supporting rod 10.

Also, as best shown in FIGS. 3 to 6, the appendages 28, 29 are transversely offset from the connecting line 27 to define a substantially horizontal gap 37 that faces the latter.

The gap 37 may be substantially flared, to allow the pipeline 2 to be fitted therein in a substantially horizontal position, parallel to the connecting line 27, before being rotated about its rotation axis X.

Once the rotation is completed, the pipeline 2 is in a locked position that is substantially vertical relative to the support 1 and the rod 10, and is housed in the seats 30, 31 with its outer wall 2A abutting the inner walls 32', 33' of the curved sections 32, 33 of both appendages 28, 29.

Therefore, the inner walls 32', 33' of the curved sections 32, 33 are adapted to laterally retain, on opposite directions, the pipeline section 2 of the drop hose irrigation device 1'.

In an alternative embodiment, not shown, the support 1 may be also connected by snap engagement, via the bracket 15, to a vertical supporting rod 10.

In this configuration, the pipeline 2 may be inserted in a vertical position, parallel to the connecting line 27, and may be rotated along a horizontal axis X that does not lie on the same plane as the connecting line 27 and is perpendicular thereto. Furthermore, the final locked position of the pipeline 2 will be substantially horizontal, and not vertical.

Figure 7A:
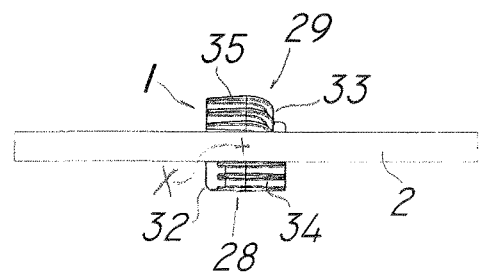
FIGS. 7A to 7C are perspective and front views of a few steps of the method of connecting the pipeline to a rod of a truss of an irrigation system of the invention.
Figure 7A:
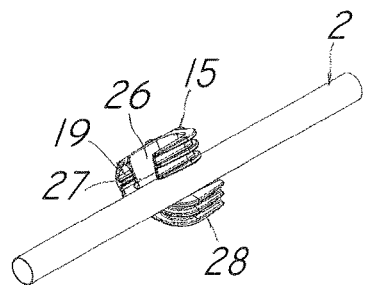
Figure 7B:
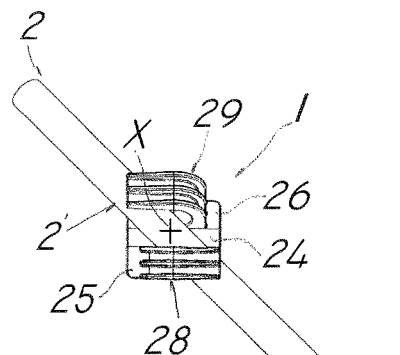
Figure 7B:
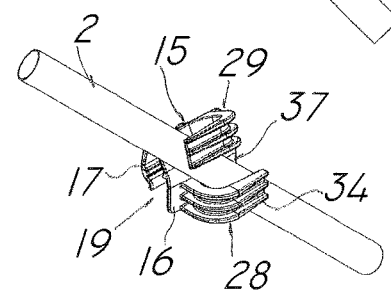
Figure 7C:
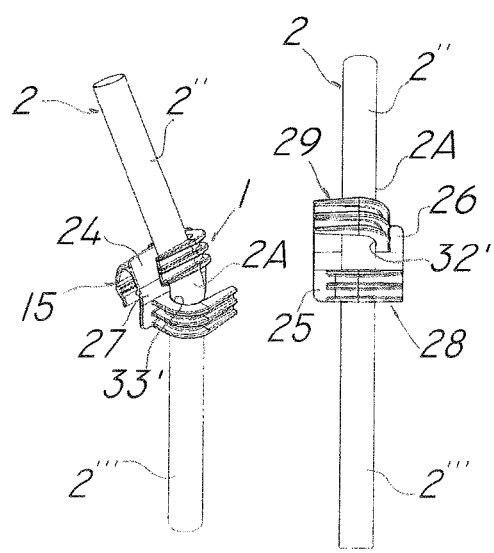

In a further aspect, the invention relates to a method of mounting a drop hose device 1' to a supporting rod 10 of a truss 3 of a gravity-fed irrigation system 4, whose steps are best shown in FIGS. 7a to 7c.

The method first comprises a step of a) connecting the pipeline 2 to a liquid feeding line 8 of the system 4 and a step of b) providing the support 1 as described above with a bracket 15 having two substantially horizontal and vertically offset appendages 28, 29 which define a substantially horizontal gap 37 therebetween, and respective substantially horizontal locking seats 30, 31.

These are followed by a step c) of snap-fit coupling of the bracket 15 to the rod 10, a step of d) arranging the pipeline section 2 in a substantially horizontal position and introducing it into the gap 37 and a step of e) rotating the pipeline section 2 by an angle of substantially 90.degree. about the substantially horizontal axis X to a substantially horizontal locked position thereof in the seats 30, 31.

Of course, in the embodiment in which the irrigation system 4 comprises a plurality of pipelines 2, each of them will be connected to the supporting rod 10 by repeating the above described steps.

Furthermore, once the rod 10 has been connected, the position of the pipelines 2 along the rod 10, and hence their relative distances, may be adjusted by frictionally sliding their respective supports 1 along the rod 10 according to the size and configuration of the soils T to be irrigated, and namely according to the relative distance between the crop rows.

In an alternative embodiment of the method, the steps of inserting and locking the pipeline 2 in the support 1 may be carried out prior to the step of snap-fit coupling of the bracket 15 of the support 1 to the rod 10, without departure from the scope of the present invention.

It will be appreciated from the foregoing that the irrigation system and the connecting method fulfill the intended objects and particularly afford simple and stable connection of a pipeline to a supporting rod of an irrigation system.

While the support, the irrigation system and the connecting method have been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in factories operating in the field of irrigation systems for agricultural applications.

The invention claimed is:

1. A drop hose irrigation device (1') comprising:
   a substantially vertical pipeline section (2), which is configured to be secured to a truss (3) of an irrigation system (4) having a substantially horizontal supporting rod (10); and
   a support (1) having a substantially U-shaped bracket (15), said bracket (15) having a pair of side walls (16, 17) joined together by a substantially cylindrical connecting wall (18) extending along a substantially horizontal axis;
   wherein said side walls and said connecting wall (16, 17, 18) have substantially cylindrical smooth inner surfaces (20, 21) with substantially parallel opposed longitudinal projections (22, 23) for snap-fit locking engagement of said bracket (15) on the supporting rod (10), and
   wherein a pair of substantially horizontally and vertically offset curved appendages (28, 29) extend from one of said side walls (16) and define a pair of substantially vertical locking seats (30, 31) and a substantially horizontal gap (37), said locking seats (30, 31) having oppositely directed concavities for receiving said pipeline section (2) in said gap (37) and locking said pipeline section within said seats (30, 31) by rotation about a substantially horizontal axis (X) from a substantially horizontal position to a substantially vertical position.

2. The device as claimed in claim 1, wherein one of said side walls (16) defines a supporting surface (24) for the pipeline section (2) to rest thereupon.

3. The device as claimed in claim 2, wherein said supporting surface (24) comprises a first substantially flat portion (25) and a second portion (26), which is also substantially flat and is inclined relative to the first portion, said first and said second portions (25, 26) being joined together along a substantially longitudinal connecting line (27).

4. The device as claimed in claim 1, implemented in the irrigation system (4) comprising a feeding line (8) for feeding an irrigation liquid, wherein said pipeline section (2) has an upper end (12) in fluid communication with the feeding line (8) and a lower end (13) equipped with a liquid emitter (14).

5. A method of mounting a drop hose irrigation device (1') as claimed in claim 1 to a substantially horizontal supporting rod (10) of a truss (3) of an irrigation system (4), the method comprising:
   a) connecting said pipeline section (2) to a liquid feeding line (8) of the irrigation system (4);
   b) providing said support (1) with said bracket (15) having said pair of substantially horizontal and vertically offset appendages (28, 29), which define said substantially horizontal gap (37) therebetween, and said substantially vertical locking seats (30, 31);

c) coupling said bracket (15) to the supporting rod (10) by snap-fit engagement;

d) arranging said pipeline section (2) in a substantially horizontal position and introducing said pipeline section into said gap (37); and e) rotating said pipeline section (2) by an angle of substantially 90° about a substantially horizontal axis (X) to a substantially vertical locked position inside said substantially vertical locking seats (30, 31).

6. A drop hose irrigation device (1') comprising:

a substantially vertical pipeline section (2), which is configured to be secured to a truss (3) of an irrigation system (4) having a substantially horizontal supporting rod (10); and a support (1) having a substantially U-shaped bracket (15), said bracket (15) having a pair of side walls (16, 17) joined together by a substantially cylindrical connecting wall (18) extending along a substantially horizontal axis;

wherein said side walls and said connecting wall (16, 17, 18) have substantially cylindrical smooth inner surfaces (20, 21) with substantially parallel opposed longitudinal projections (22, 23) for snap-fit locking engagement of said bracket (15) on the supporting rod (10), wherein a pair of substantially horizontally and vertically offset curved appendages (28, 29) extend from one of said side walls (16) and define a pair of substantially vertical locking seats (30, 31) and a substantially horizontal gap (37), said locking seats (30, 31) having oppositely directed concavities for receiving said pipeline section (2) in said gap (37) and locking said pipeline section within said seats (30, 31) by rotation about a substantially horizontal axis (X) from a substantially horizontal position to a substantially vertical position, wherein one of said side walls (16) defines a supporting surface (24) for the pipeline section (2) to rest thereupon, wherein said supporting surface (24) comprises a first substantially flat portion (25) and a second portion (26), which is also substantially flat and is inclined relative to the first portion, said first and said second portions (25, 26) being joined together along a substantially longitudinal connecting line (27), and wherein said substantially horizontal rotation axis (X) of said pipeline (2) intersects said substantially longitudinal connecting line (27).

7. The device as claimed in claim 6, a first one of said pair of appendages (28) extends from said first portion (25) and a second one of said pair of appendages (29) extends from said second portion (26) with respective substantially curved connecting sections (32, 33).

8. The device as claimed in claim 7, wherein each of said appendages (28, 29) comprises a straight section, which is spaced apart from each of the first and second portions (25, 26) of said supporting surface (24) and is adapted to define a slot (30, 31) with curved sections (32, 33), said curved sections (32, 33) having a substantially semicircular shape substantially mating a shape of said pipeline section (2).

9. The device as claimed in claim 7, wherein said appendages (28, 29) are substantially parallel to said longitudinal connecting line (27) and are transversely offset to define said open gap (37) that faces said longitudinal connecting line (27).

10. The device as claimed in claim 9, wherein said gap (37) is substantially flared to allow the pipeline section (2) to be introduced in a substantially horizontal position, parallel to said longitudinal connecting line (27) before being rotated about said substantially horizontal axis (X), perpendicular to said longitudinal connecting line (27), to be locked in the substantially vertical position.

* * * * *